(12) United States Patent
Badger et al.

(10) Patent No.: US 11,168,670 B2
(45) Date of Patent: Nov. 9, 2021

(54) WIND TURBINE SAFETY SYSTEM

(71) Applicant: VESTAS WIND SYSTEMS A/S, Aarhus N (DK)

(72) Inventors: Paul Badger, Salisbury (GB); Brian Daugbjerg Nielsen, Risskov (DK); Peter Tranum Thomsen, Brabrand (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 134 days.

(21) Appl. No.: 16/473,000

(22) PCT Filed: Dec. 13, 2017

(86) PCT No.: PCT/DK2017/050425
§ 371 (c)(1),
(2) Date: Jun. 24, 2019

(87) PCT Pub. No.: WO2018/113877
PCT Pub. Date: Jun. 28, 2018

(65) Prior Publication Data
US 2019/0323484 A1  Oct. 24, 2019

(30) Foreign Application Priority Data

Dec. 22, 2016 (DK) .............. PA201671037

(51) Int. Cl.
*F03D 80/40* (2016.01)
*F03D 17/00* (2016.01)
*F03D 7/04* (2006.01)

(52) U.S. Cl.
CPC ............ *F03D 80/40* (2016.05); *F03D 7/048* (2013.01); *F03D 17/00* (2016.05); *F05B 2260/821* (2013.01); *F05B 2270/107* (2013.01)

(58) Field of Classification Search
CPC .......... F03D 80/40; F03D 17/00; F03D 7/048; F05B 2260/821; F05B 2270/107; Y02E 10/72
(Continued)

(56) References Cited

U.S. PATENT DOCUMENTS 7,086,834 B2 *  8/2006  LeMieux ............... F03D 7/02 416/1
9,567,869 B2 *  2/2017  Lauritsen ............... F01D 25/00
(Continued)

FOREIGN PATENT DOCUMENTS

| CN | 101201413 A | 6/2008 |
| CN | 101737245 A | 6/2010 |

(Continued)

OTHER PUBLICATIONS

Chinese Office Action for Application 201780079008.3 dated May 6, 2020.
(Continued)

*Primary Examiner* — J. Todd Newton
(74) *Attorney, Agent, or Firm* — Patterson + Sheridan, LLP

(57) ABSTRACT

The present invention relates to a method, controller, wind turbine and wind farm that advantageously determines an ice throw risk zone (302) for a wind turbine (301), wherein the ice throw risk zone (302) defines an area surrounding the wind turbine (301) within which ice can be thrown from one or more blades of the wind turbine (301); determining whether the determined ice throw risk zone (302) impinges one or more exclusion zones; and if the determined ice throw risk zone (302) impinges one or more exclusion zones, determining an alteration to one or more operating parameters of the wind turbine (301) in order to alter the ice throw
(Continued)

risk zone (302) such that the determined ice throw risk zone (302) does not impinge the one or more exclusion zones.

20 Claims, 7 Drawing Sheets

(58) Field of Classification Search
USPC .......................................................... 416/1
See application file for complete search history.

(56) References Cited

U.S. PATENT DOCUMENTS

| | | | |
|---|---|---|---|
| 2010/0098540 A1* | 4/2010 | Fric | F03D 7/0224 416/36 |
| 2014/0003939 A1* | 1/2014 | Adams | F03D 7/0284 416/1 |
| 2014/0091572 A1 | 4/2014 | Jepsen | |
| 2015/0056074 A1 | 2/2015 | Veldkamp et al. | |
| 2017/0058871 A1* | 3/2017 | Movsichoff | F03D 7/0224 |
| 2017/0370350 A1* | 12/2017 | Olesen | F03D 17/00 |
| 2019/0323484 A1* | 10/2019 | Badger | F03D 7/048 |

FOREIGN PATENT DOCUMENTS

| | | | | |
|---|---|---|---|---|
| DE | 102016124398 A1 | * | 6/2018 | ............. F03D 80/40 |
| EP | 2055940 A2 | | 5/2009 | |
| EP | 3150850 A1 | * | 4/2017 | ........... F03D 7/0296 |
| KR | 20140014898 A | | 2/2014 | |
| WO | 2011117246 A2 | | 9/2011 | |

OTHER PUBLICATIONS

PCT Written Opinion of the International Searching Authority for Application No. PCT/DK2017/050425 dated Mar. 19, 2018.
Seifert et al., "Risk Analysis of Ice Throw from Wind Turbines", Paper presented at Boreas 6, Apr. 9 to 11, 2003, Pyha, Finland, 10 pages.
LeBlanc, "Recommendations for Risk Assessments of Ice Throw and Blade Failure in Ontario", Canadian Wind Energy Association, May 31, 2007, 28 pages.
Biswas et al., "A Model of Ice Throw Trajectories from Wind Turbines", Wind Energy, 2011, 14 pages.
PCT International Search Report for Application No. PCT/DK2017/050425 dated Mar. 19, 2018.
Danish Patent and Trademark Office, 1st Technical Examiniation of Patent Application, PA 2016 71037, Jun. 23, 2017.

* cited by examiner

PRIOR ART   Figure 1

WIND TURBINE SAFETY SYSTEM

The present invention relates to a wind turbine safety system and, in particular, to an ice throw risk safety system.

BACKGROUND

Wind turbines generate electrical power from wind energy and can be situated on land or off-shore. Wind turbines situated in cold climates can suffer from icing events where ice may be formed on the surface of the wind turbine blades due to freezing water on the cold surface. The accumulation of ice on the surface of a blade can result in undesirable consequences.

For example, ice accretion on the wind turbine blades presents a risk of ice throw damaging nearby properties or injuring people or animals in the vicinity of the wind turbine as ice attached to a blade may become loose and be thrown away from the wind turbine by the rotation of the blade.

Legislation and operational requirements in several countries force wind farms to be shutdown if there is a risk of ice accretion on the wind turbine blades as there is a subsequent risk that the ice may break loose and be thrown from the wind turbine. The legislation typically requires the wind turbines are shutdown irrespective of whether any ice accretion on the blades that may be thrown would actually impact any nearby property, or if there is any risk of injury to persons or animals. As such, if there is no risk to property etc., then the wind turbines are still shutdown which reduces the Annual Energy Production (AEP) of the wind turbines in the wind farm.

Therefore, it is disadvantageous to simply shutdown one or more wind turbines (or a complete wind farm) on the basis of ice accretion, or expected ice accretion, on the wind turbine blades as this reduces the AEP of the wind turbines/ wind farm.

The present invention seeks to address, at least in part, some or all of the disadvantages described hereinabove.

SUMMARY OF THE INVENTION

According to a first aspect of the present invention, there is provided a method comprising determining an ice throw risk zone for a wind turbine, wherein the ice throw risk zone defines an area surrounding the wind turbine within which ice can be thrown from one or more blades of the wind turbine; determining whether the determined ice throw risk zone impinges one or more exclusion zones; and if the determined ice throw risk zone impinges one or more exclusion zones, determining an alteration to one or more operating parameters of the wind turbine in order to alter the ice throw risk zone such that the determined ice throw risk zone does not impinge the one or more exclusion zones.

Thus, the present invention identifies whether an ice throw risk zone for a wind turbine impinges upon an exclusion zone and, if so, determines an alteration to the wind turbines operating parameters in order to alter the ice throw risk zone so that it does not impinge upon any exclusion zone. This advantageously enables wind turbines to keep operating and generating electrical power rather than simply being shutdown when ice is present on the wind turbine blades.

Determining the ice throw risk zone for the wind turbine may further comprise obtaining one or more parameters, wherein the parameters include operating parameters of the wind turbine, environmental parameters at or near the wind turbine, ice parameters and structural parameters of the wind turbine; and determining the ice throw risk zone based on one or more of the obtained parameters.

The operating parameters may include one or more of a rotor speed value indicative of a rotational speed of a rotor of a wind turbine, blade pitch angle and blade azimuth; the environmental parameters may include a wind speed value indicative of a wind speed at or near the wind turbine; the ice parameters may include one or more of ice mass, ice type, and ice location; and the structural parameters may include one or more of hub height, and blade length.

Determining the ice throw risk zone may be based on a ballistic model.

Determining whether the determined ice throw risk zone impinges one or more exclusion zones may further comprise comparing a location of the ice throw risk zone with a location of one or more exclusion zones. Comparing the location of the ice throw risk zone with the location of one or more exclusion zones may be based on maps, coordinates and/or pattern matching. The location of one or more exclusion zones may be stored in memory and/or lookup tables.

Determining whether the determined ice throw risk zone impinges one or more exclusion zones may further comprise obtaining terrain parameters; and wherein the determination of the ice throw risk zone is further based on the obtained terrain parameters.

The method may further comprise obtaining a risk value associated with the one or more exclusion zones; and wherein the determination of the ice throw risk zone is further based on the associated risk value for the one or more exclusion zones. The risk value may reduce the ice throw risk zone. The risk value may be a variable risk value.

If the determined ice throw risk zone impinges one or more exclusion zones, the method may further comprise shutting down the wind turbine.

Determining the alteration to the one or more operating parameters may further comprise determining an alteration to the rotor speed, wherein the alteration to the rotor speed reduces the ice throw risk zone.

Determining the alteration to the one or more operating parameters may further comprise determining an alteration to the yaw angle, wherein the alteration to the yaw angle alters the angle of the ice throw risk zone.

Determining the alteration to the one or more operating parameters may further comprise determining an alteration to the rotor speed, wherein the alteration to the rotor speed reduces the ice throw risk zone; and determining an alteration to the yaw angle, wherein the alteration to the yaw angle alters the angle of the ice throw risk zone.

Determining the alteration to the one or more operating parameters may further comprise determining one or more simulated power curves for the altered operating parameters; and identifying an optimal alteration to the one or more operating parameters based on the simulated power curves.

Determining the alteration to the one or more operating parameters may be performed iteratively until an alteration to the one or more operating parameters may be identified that ensures the ice throw risk zone does not impinge any exclusion zone.

The determination of the alteration to the one or more operating parameters may comprise determining a pitch strategy for one or more blades to induce stall, and/or vibrations, and/or deformation in the one or more blades such that ice is thrown from the one or more blades at or near the lowest point of rotation of the one or more blades in order to reduce the ice throw risk zone.

According to a second aspect of the present invention there is provided an ice throw risk safety system comprising: one or more controllers adapted to, or configured to, implement any one of the method and features of the present invention described hereinabove.

According to a third aspect of the present invention there is provided a wind turbine comprising: a tower; a nacelle located on top of the tower; a rotor operatively attached to the nacelle; one or more rotor blades operatively attached to the rotor; and one or more controllers configured to or adapted to implement any one of method and features of the present invention described hereinabove.

According to a fourth aspect of the present invention there is provided a wind farm comprising: a wind farm controller; a plurality of wind turbines; wherein each wind turbine includes a wind turbine controller; and an ice throw risk safety system configured to implement any one of the method and features described hereinbove.

The ice throw risk safety system may be implemented by either the wind farm controller or the wind turbine controller, or any combination thereof.

According to a fifth aspect of the present invention there is provided a computer program product comprising computer executable code adapted to or configured to implement any one of the method and features described hereinabove.

DRAWINGS

Embodiments of the present invention will now be described, by way of example only, and with reference to the accompanying drawings, in which.

Figure 4A:
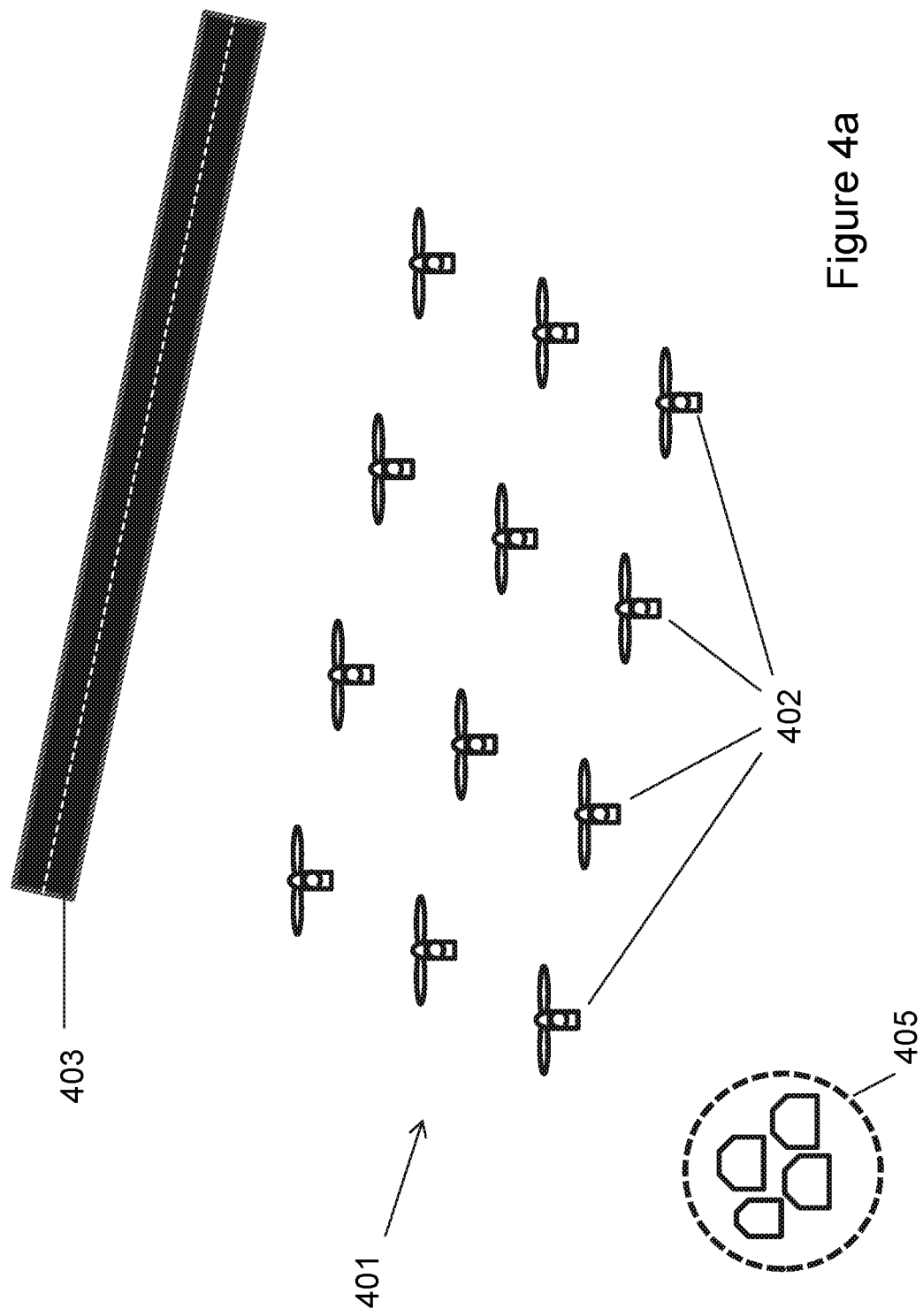
Figure 4B:
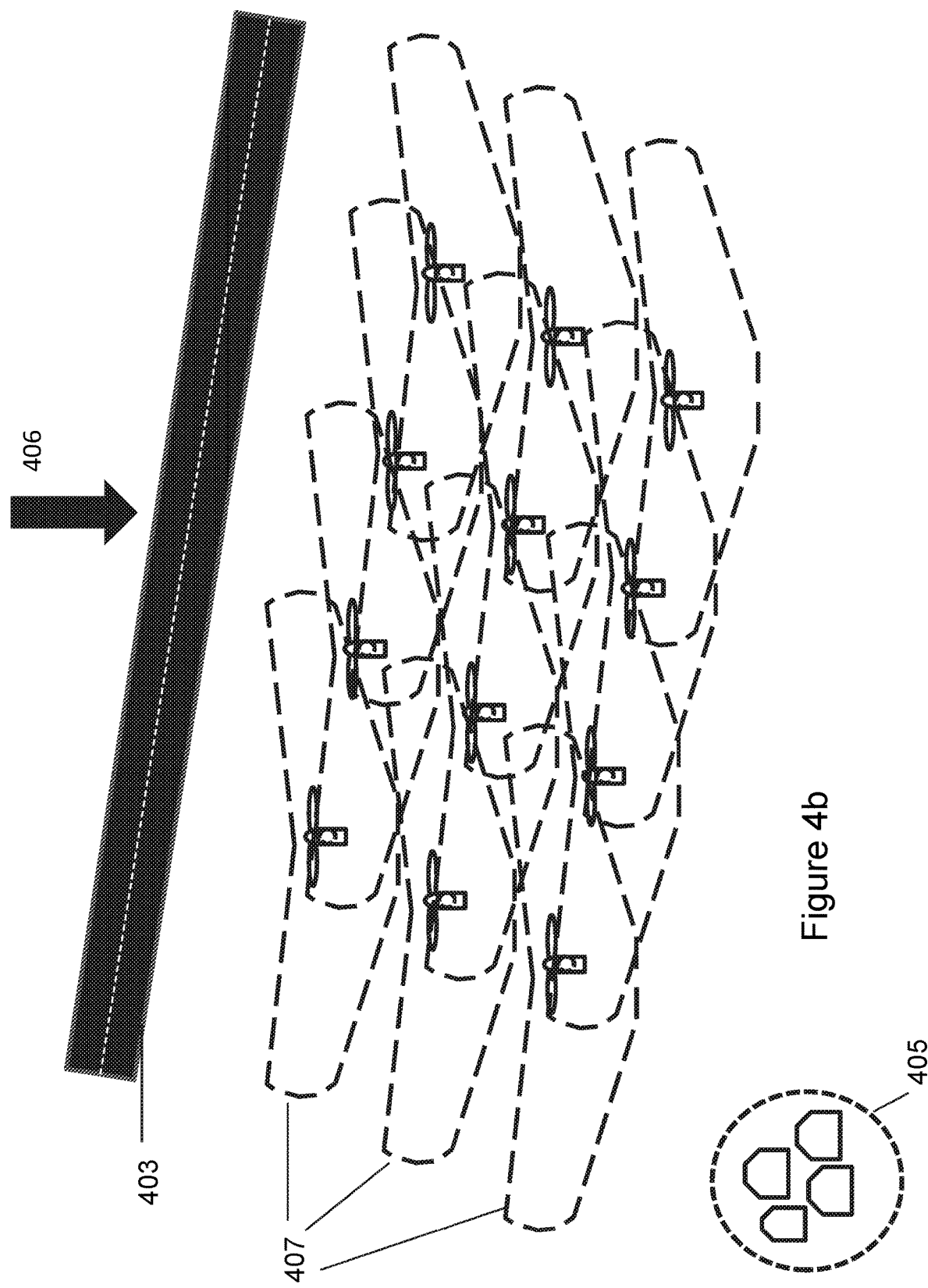
Figure 4C:
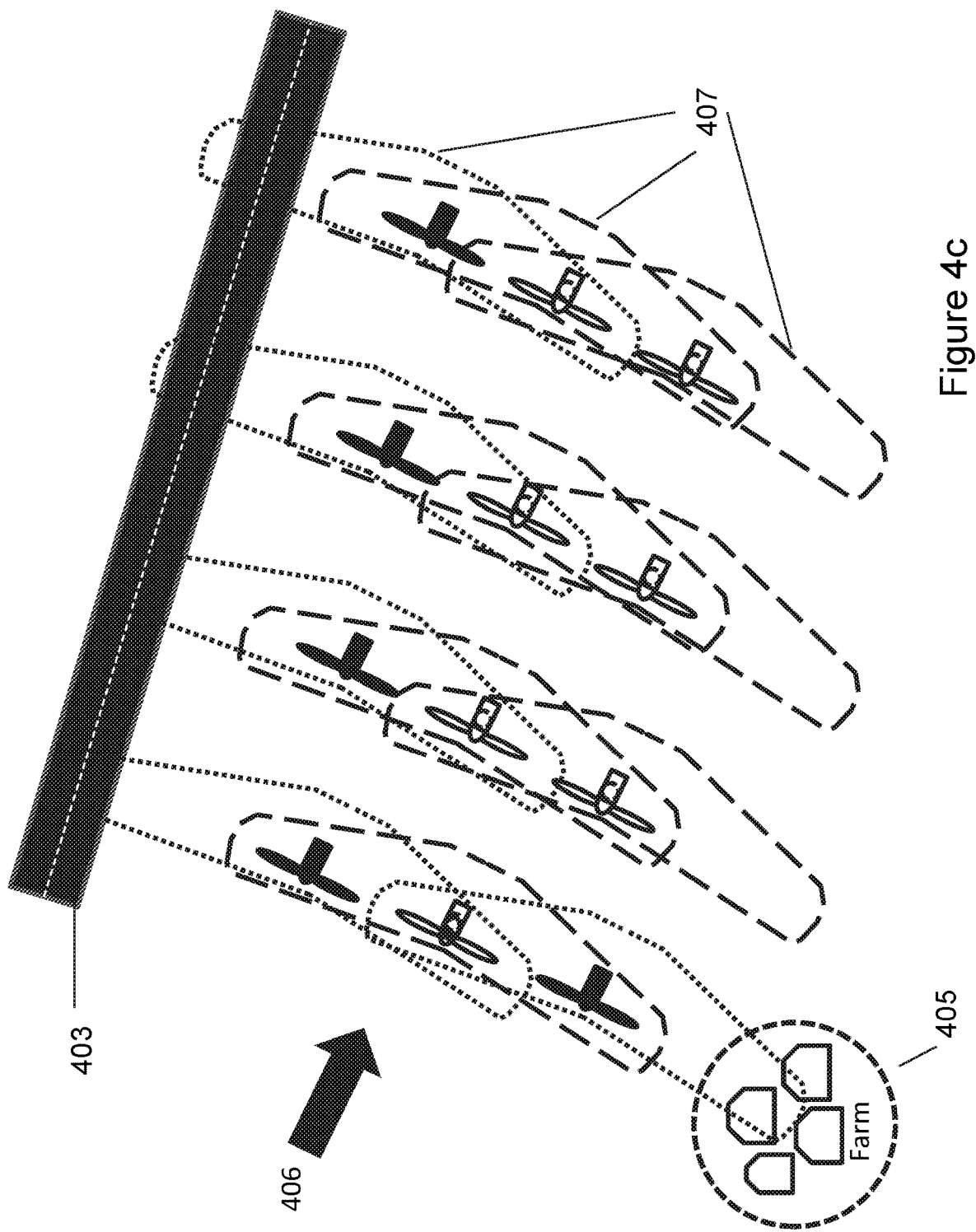

FIGS. 4a, 4b, and 4c show schematic diagrams of wind farms and the ice throw risk zones near public areas according to one or more embodiments of the present invention.

Figure 5:
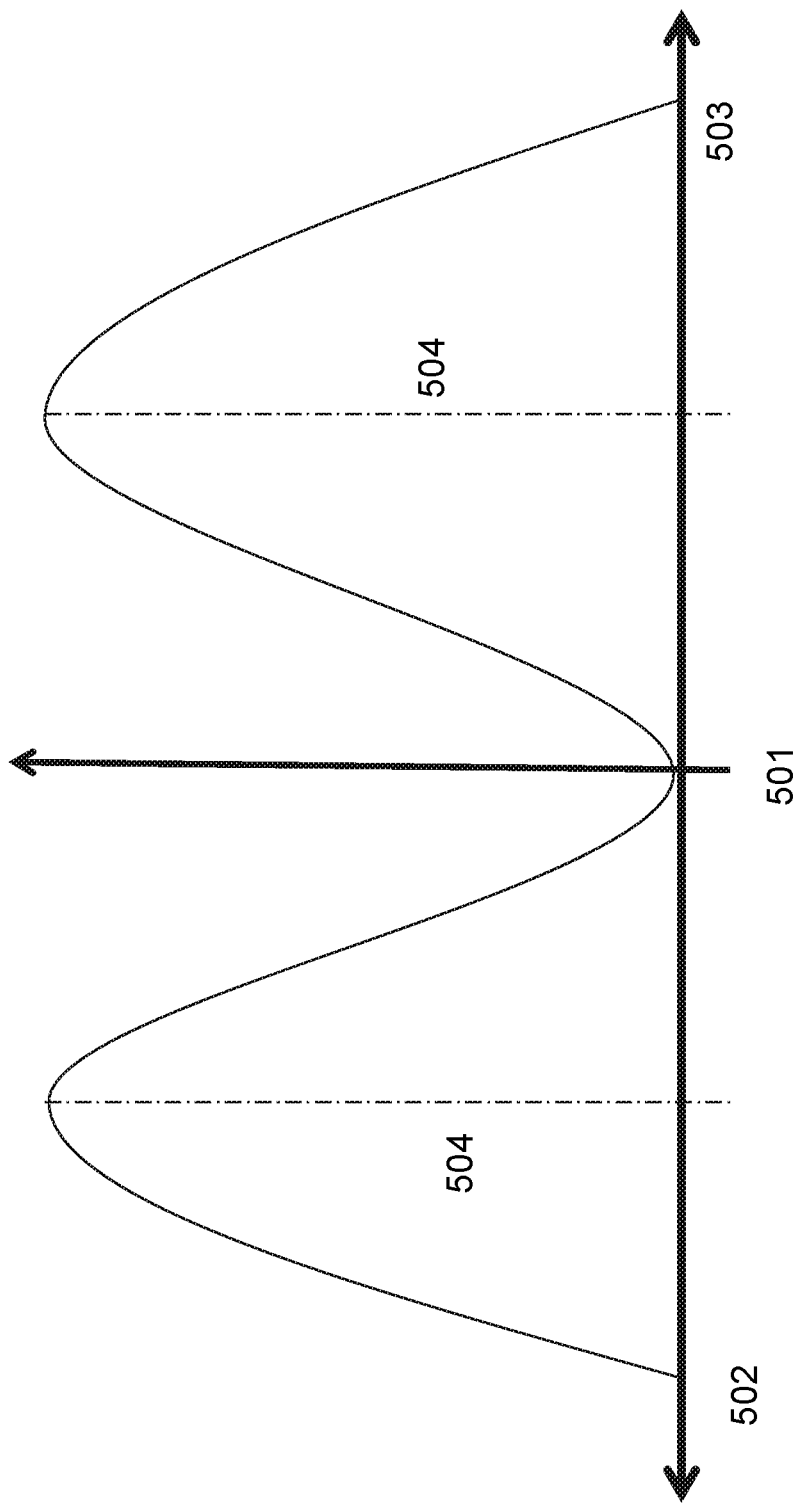

FIG. 5 shows a probability and risk distribution for ice throw risk according to one or more embodiments of the present invention.

DESCRIPTION OF EMBODIMENTS

Figure 1:
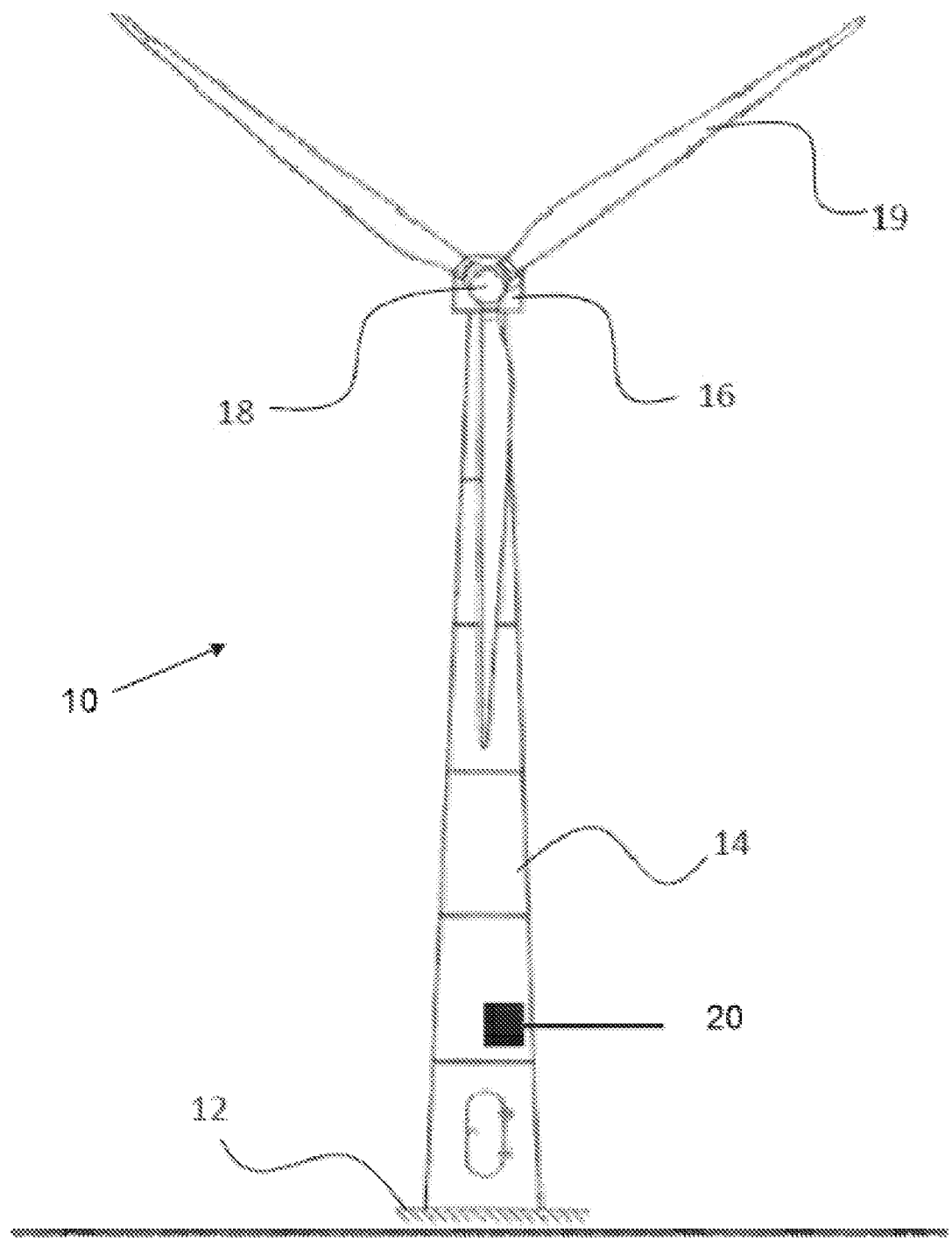
FIG. 1 is a schematic of a wind turbine according to one or more embodiments of the present invention.

FIG. 1 shows a schematic of a typical wind turbine 10. The wind turbine 10 is mounted on a base 12 which may be onshore foundations or off-shore platforms or foundations. The wind turbine includes a tower 14 having a number of tower sections. A nacelle 16 is located and attached to the top of tower 14. A wind turbine rotor, connected to the nacelle 16, includes a hub 18 and at least one wind turbine blade 19, where in FIG. 1 three wind turbine blades are shown although any number of wind turbine blades 19 may be present depending on the design and implementation of the wind turbine 10. The wind turbine blades 19 are connected to the hub 18 which in turn is connected to the nacelle 16 through a low speed shaft which extends out of the front of the nacelle 16. The wind turbine 10 typically includes a wind turbine controller 20 which may be located within the wind turbine, e.g. in the hub 18, in the nacelle 16, in the tower 14, or any other suitable location within or near the wind turbine 10.

Figure 2:
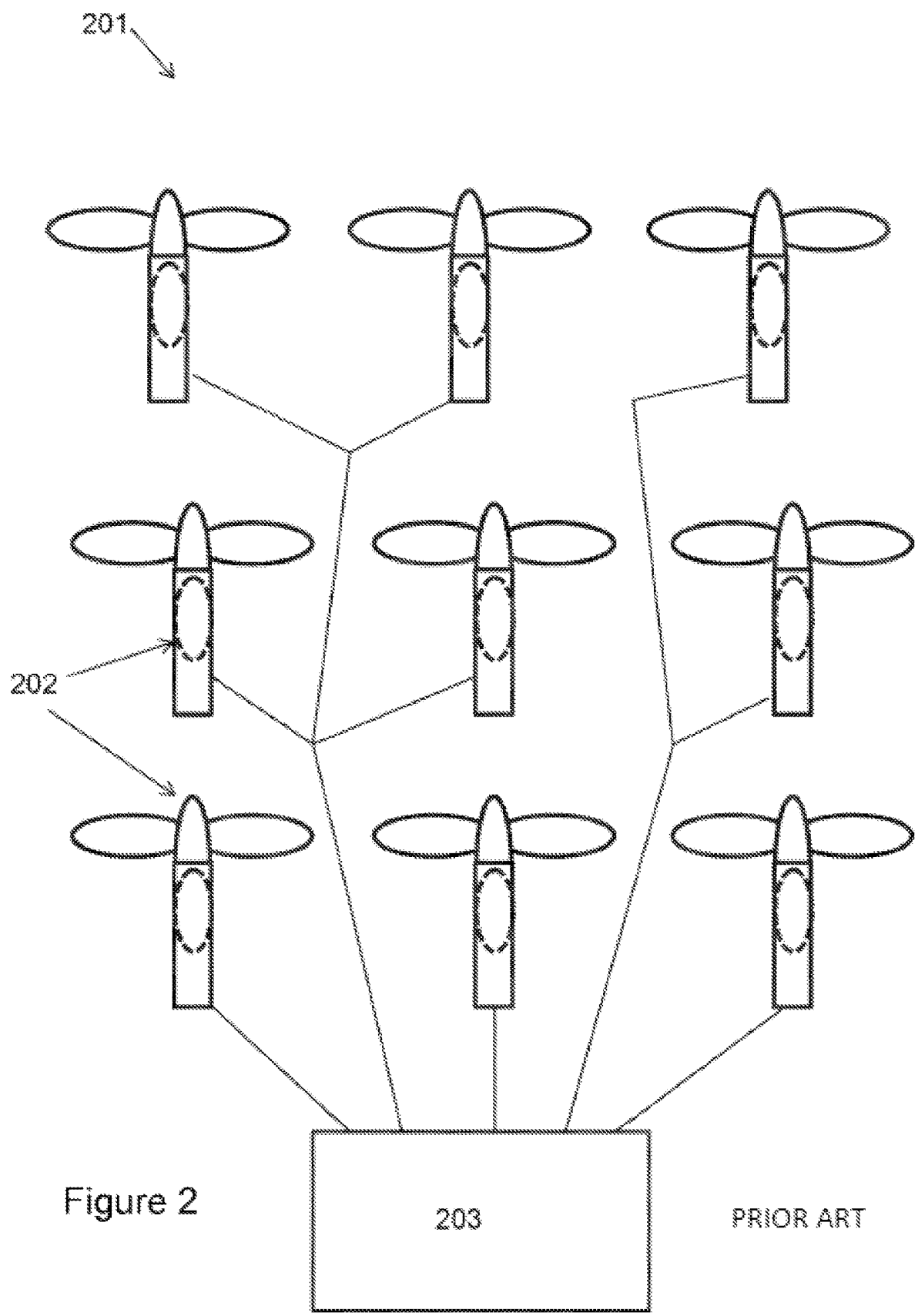
FIG. 2 shows a schematic of a wind farm according to one or more embodiments of the present invention.

FIG. 2 shows a schematic of a wind farm 201, where a typical wind farm includes a plurality of wind turbines 202. The wind farm may be controlled by a wind farm controller 203 located at, or operatively connected to, the wind farm 201.

As discussed hereinabove, if ice is detected on wind turbine blades then the wind turbine 202, multiple wind turbines 202 or the complete wind farm 201, is typically shutdown irrespective of the actual risk of ice throw from the wind turbines to nearby properties, people or animals. This is disadvantageous as it reduces the AEP of a wind farm 201 caused by unnecessary shutdown of the wind turbines 202.

Figure 3:
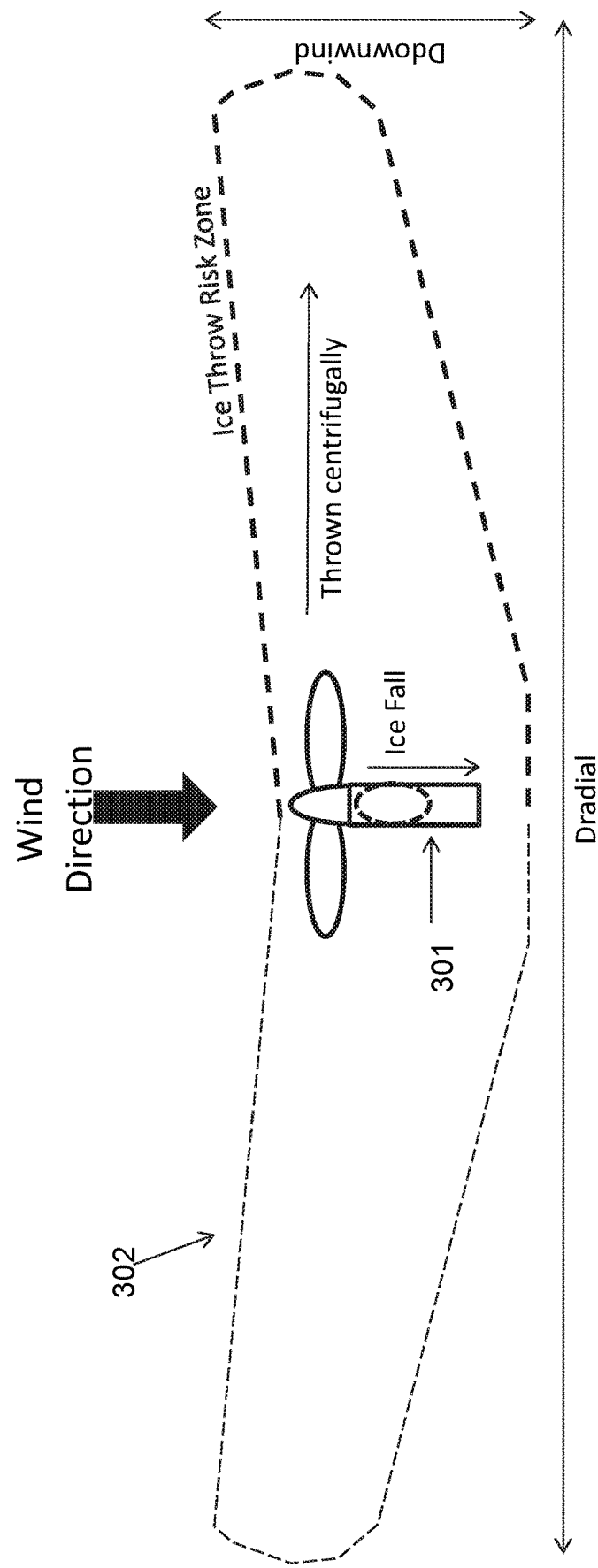
FIG. 3 shows a schematic of an ice throw risk zone for a single wind turbine according to one or more embodiments of the present invention.

With reference to FIG. 3, an ice throw risk zone 302 is shown schematically around a single wind turbine 301. As can be seen, the ice throw risk zone 302 is shaped such that it substantially matches the actual, predicted or expected area within which there is an actual risk of ice being thrown from the wind turbine 301.

The ice throw risk zone 302 in the present invention is not a fixed ice throw risk zone but a dynamic or adaptive ice risk throw zone that is updated or determined based on operating and/or environmental conditions at or near to the wind turbine.

As the ice throw risk zone 302 is not fixed then it reflects the actual ice throw risk zone 302 for the wind turbine depending on actual current operating and wind conditions and/or parameters at any given time. Accordingly, it can be determined at any given point in time whether any property, people or animals are at risk from ice throw meaning that the wind turbine may not require shutting down which advantageously increases the efficiency and Annual Energy Production (AEP) for a wind farm.

In the following embodiments, each individual wind turbine via its wind turbine controller may determine its own ice throw risk zone and determine, on a wind turbine level, whether its own ice throw risk zone impinges upon an exclusion zone. The individual wind turbine may then determine the necessary action(s) to alter its own the ice throw risk zone. However, as will be appreciated, the wind farm controller may alternatively determine the ice throw risk zone for each wind turbine in the wind farm and issue the appropriate control signals to each wind turbine. Alternatively, the wind farm controller and the individual wind turbine controller may work in combination and cooperation in order to implement the embodiments of the present invention, for example, the wind farm controller may manage the exclusion zones and the wind turbine controller manage its ice throw risk zone. As will be appreciated, the wind farm controller and wind turbine controller may co-operate in any suitable manner to implement the features of the present invention.

The ice risk throw zone 302 determined by the individual wind turbines may have both radial and downwind direction components which may be determined based on, for example, an ice throw ballistic model. An ice throw ballistic model may be used to determine the ice throw risk zone as the ice will be thrown from the wind turbine blades in a similar manner to a projectile. Ballistic models are known in the art, for example, ballistic models in relation to ice throw from wind turbines is given in "Modelling Of Ice Throws from Wind Turbines", Joakim Renström, Department of Earth Sciences, Uppsala University, Villavägen, 2015, ISSN 1650-6553.

The ballistic models can be quite complex and detailed so they are not duplicated in detail as they are known in the art and would be readily understood by a skilled person the art. However, a basic and simplistic model summary is given for reference where the radial distance (Dradial) and downwind distance (Ddownwind) of the ice throw risk zone can be determined based on:

Dradial=Func (RPM); and
Ddownwind=Func (H, WS); where
RPM=Rotor revolution Per Minute;
H=Hub Height; and
WS=Windspeed Therefore, the area of the ice throw risk zone in the radial direction can be determined in real time based on, for example, the RPM of the wind turbine (either measured directly or estimated). This is because the distance that any ice being shed from the blades may be thrown in the radial direction is dependent on the current RPM of the wind turbine, e.g. the greater the RPM the further ice shed from the blades may be thrown as the greater the RPM the greater the initial velocity of the ice when being thrown from the wind turbine blades.

The area of the ice throw risk zone in the downwind direction can be determined in real time based on the hub height of the wind turbine in combination with the current wind speed (either measured directly or estimated). This is because both the hub height and wind speed can affect the distance in the downwind direction, e.g. the greater the hub height and/or the greater the wind speed the greater the distance in the downwind direction that ice shed from the blades may be thrown.

In the above described method of determining the ice throw risk zone 302, parameters relating to the ice on the wind turbine blades were not taken into account. This more simplified model of the ice throw risk zone determination was therefore based on assumptions or averaged ice parameters, for example that the ice forms at the tip of the wind turbine blades and has a mass of 2 kilograms.

A more accurate determination of the ice throw risk zone 302 may therefore be achieved by further taking into account the parameters relating to the ice accretion on the wind turbine blades. The ice parameters may include values indicative of the size of ice, mass of ice and/or location of ice on the wind turbine blades.

As such, the wind turbine may include sensors that enable the ice related parameters to be determined, either directly or indirectly. Methods and sensors for determining ice related parameters are known in the art and would be readily understood and available to a skilled person in the art. For example, known blade load sensors may be used to determine mass and/or location of ice on the blades, known optical sensors in the blades can detect the build-up of ice on the blades to determine location and/or size of the ice, imaging apparatus, e.g. cameras, may be used to monitor and detect the location and/or size of ice on the blades, and so on.

Accordingly, in this example, the ice throw risk zone in the radial and downwind directions can be determined from the following:

Dradial=Func (RPM, IceParameters); and
Ddownwind=Func (H, WS, IceParameters); where
IceParameters may include one or more of ice size, ice mass, and ice location.

By taking into account information relating to the actual ice on the blades, a more accurate determination of the ice throw risk zone 302 can be made.

Further parameters may be taken into account when determining the ice throw risk zone in the radial and downwind directions. For example, additional parameters may include the angle to the horizontal of the blade from which the ice is being thrown (throw angle), gravity, drag coefficients, air density, rotor radius, ice type (e.g. rime ice, glaze ice, etc.), and so on.

The function mentioned hereinabove may be a ballistic model which, as previously mentioned, is known in the art and so has not been described in significant detail. However, a simplified explanation is given hereinabove for reference and embodiments of the present invention are directed towards the adaptive or dynamic control and safety system once the ice throw risk zone has been determined.

The orientation of the ice risk throw zone 302 may be dependent on the wind direction, which should substantially match the orientation of the wind turbine, as conventionally the wind turbine will be controlled to orientate itself into the wind direction in order to generate the maximum energy from the wind and to reduce loads on the wind turbine.

As such, the ice risk throw zone 302 is dynamic in area and orientation based on the current operating parameters and current environmental conditions at or near the wind turbine.

Once the ice throw risk zone 302 has been determined by a wind turbine it may then determine whether the ice throw risk zones impinge upon one or more exclusion zones (e.g. public/private buildings, public/private land, paths, roads, etc.) where ice should be prevented from being thrown in order to prevent damage or injury to property, persons or livestock.

For example, the wind turbine may store a map of the local terrain with exclusions zones marked so that the wind turbine can identify via shape matching, coordinate matching, or any other suitable means for identifying whether the current ice throw risk zone of the wind turbine impinges any exclusion zones. This process of identifying whether the ice throw risk zone impinges upon any exclusion zones may be implemented using look-up tables or actual/representative maps.

The process of identifying or determining whether the ice throw risk zone impinges upon one or more exclusion zones may further take into account aspects of the terrain that may reduce or increase the risk of the ice throw zone impinging one or more exclusion zones. Therefore, the system may obtain terrain parameters which indicate the terrain at or near the wind turbine. The terrain parameters may be stored in memory.

For example, the system may identify from the terrain parameters that there is a hill between the wind turbine and the exclusion zone which may provide a barrier between the wind turbine and the exclusion zone and thereby reduce or eliminate the risk of ice throw onto the identified or determined exclusion zone. The identification of the hill terrain between the wind turbine and the exclusion zone may therefore be taken into account and based on the terrain the determined ice throw risk zone may be reduced and as such will not impinge on the exclusion zone.

In another example, the system may identify from the terrain parameters that the wind turbine is on the top of a hill or at the edge of a slope down towards an exclusion zone which may have an effect of increasing the determined ice throw risk zone to additionally include the exclusion zone. In this case, the identification of the sloped terrain may therefore be taken into account and based on the terrain it can be determined that the ice throw risk zone will additionally impinge upon the exclusion zone.

The safety system may also take into account details relating to the exclusion zones, e.g. the dimensions of any buildings, construction materials, land surface (e.g. water, concrete, soil), and so on.

Once it is determined that the ice throw risk zone of one or more wind turbines impinges on an exclusion zone then the operation of the wind turbine may be altered in order to reduce the ice throw risk.

Initially, each wind turbine that is determined to impinge upon an exclusion zone may be automatically shutdown so that there is no risk of ice being thrown onto the exclusion zone. Alternatively, the wind turbine that is determined to impinge an exclusion zone may be de-rated in order to ensure that there is no risk of ice being thrown into the exclusion zone.

Whilst the wind turbine is shutdown or de-rated, it may determine a change or alteration to its operating parameters so that the ice throw risk zone would not impinge the exclusion zone and, once determined, the wind turbine may be controlled according to the altered operating parameters. This is advantageous as it reduces the risk of any ice throw into the exclusion zone whilst it determines the change or alteration to its operating parameters to alter the ice throw risk zone accordingly. The wind turbine can then be operated at the determined operating parameters enabling it to generate electrical energy.

Alternatively, the wind turbine may not be shutdown or de-rated whilst it determines a change to its operating parameters if the altered operating parameters can be determined sufficiently quickly by the wind turbine and the wind turbine operation altered accordingly within a reasonable predetermined time period and/or if a level of ice throw risk is acceptable whilst the wind turbine is determining the alteration to its operating parameters to alter the ice throw risk zone.

Accordingly, as mentioned hereinabove, it may be determined whether one or more wind turbines require a change or alteration of operating parameters based on the determined ice throw risk zone in order to reduce the ice throw risk so that the ice throw risk zone no longer impinges the defined exclusion zone.

For example, the RPM of one or more wind turbines could be reduced (e.g. curtail or de-rate the one or more wind turbines) which in turn reduces the radial area of the ice throw risk zone for the wind turbines. The ice throw risk zone may be iteratively re-determined at one or more reduced rotor speeds to identify a rotor speed which alters or reduces the ice throw risk zone to an area that no longer impinges upon any exclusion zone.

In another example, the yaw of the one or more wind turbines may be altered in order to either or both of change the orientation or the wind turbine to reduce the effective wind speed at the wind turbine (by yawing out of the wind direction) thereby altering the area of the ice throw risk zone in the downwind direction, and/or to alter the orientation of the ice throw risk zone. The ice throw risk zone may be iteratively re-determined at different yaw angles to identify a yaw angle that alters or reduces the ice throw risk zone of one or more wind turbines to an area that no longer impinges upon any exclusion zones.

In a further example, both the RPM and yaw angle may be altered in combination in order to alter or reduce the ice throw risk zone of one or more wind turbines to an area that no longer impinges upon any exclusion zones.

Therefore, the altered ice throw risk zone may be determined based on either a reduced RPM and/or an altered yaw angle. The determination of the altered RPM and/or yaw angle will be made taking into accounts their respective allowed limits for operation of the wind turbine, e.g. taking into account one or more of loads on the wind turbine, operational limits, wind speed, wind direction, wind turbine safe operation, and so on.

In a further example, the wind turbine may alternatively or additionally determine a pitch strategy for one or more of the rotor blades of the wind turbine during one or more rotations of the rotor. The ice throw from the blades of the wind turbine when the blade is near the top of the rotation will typically travel further which increases the area of the ice throw risk zone. Therefore, if the wind turbine can force the ice to be thrown when the blade is at the bottom or lowest point of the rotation, e.g. near vertically downwards, then the distance the ice will be thrown is significantly reduced, thereby reducing the ice throw risk zone. As such, the wind turbine may determine a pitch strategy for the blades which forces the ice to be thrown at or near to the bottom of its rotation. The pitch strategy may be to pitch the blades to induce stall, and/or induce vibrations, and/or induce bending/deformation of the blade at the appropriate and predetermined time defined by the pitch strategy during the rotation of the blade to cause ice to be thrown from the blade at or near to the bottom of the blade rotation.

The wind turbine may additionally or alternatively be fitted with blade actuators/exciters that cause the blade to vibrate and throw ice, where the blade actuators/exciters are activated at the appropriate and predetermined time during the rotation of the blade to cause ice to be thrown from the blade at or near to the bottom of the blade rotation.

The determined altered ice throw risk zone may alternatively be re-determined based on one of a reduced RPM or an altered yaw angle to identify if an altered ice throw risk zone does not impinge on an exclusion zone and, if unsuccessful, determines an altered ice throw risk zone on the other of the reduced RPM or altered yaw angle.

The system may also take into account the current or expected wind conditions at the wind turbine in order to further determine the optimal alteration of the wind turbine operating parameters that will generate the greatest electrical power whilst reducing the ice throw risk zone such that it does not impinge upon any exclusions zones. The control system may alternatively or additionally determine an expected or simulated power curve for one or more altered operating parameters (e.g. RPM and/or yaw position) and choose or identify the optimal altered operating parameters that provide the greatest generated power whilst ensuring the ice throw risk zone does not impinge upon an exclusion zone.

Once an ice throw risk zone has been determined which no longer impinges upon the exclusion zone then the wind turbine may be controlled accordingly to the determined altered operating parameters in order to prevent any risk of ice throw into the exclusion zone form the one or more wind turbines. Or, if the wind turbine was shutdown initially then the wind turbine may be re-started and set to operate at the altered operating parameters.

However, if there is no re-determined ice throw risk zone for the wind turbine that does not impinge on the exclusion zone then those identified wind turbines may be shutdown, or remain shutdown if initially shutdown prior to attempting to determine an alteration to the operating parameters, which ensures the ice throw risk zone does not impinge an exclusion zone.

Thus, the determination of the ice throw risk zone according to the one or more embodiments described hereinabove advantageously enables only the wind turbines which have an ice throw risk zone that impinges upon an exclusion zone to have their operating parameters altered. Furthermore, those wind turbines may no longer have to be shutdown, or remain shutdown, if the associated ice throw risk zone can be altered such that it no longer impinges upon any exclusion zone. This is advantageous in that those wind turbines can continue to generate electricity, albeit at potentially a reduced or a sub-optimal level, which increases the efficiency and AEP of the wind turbine/wind park.

The remaining wind turbines, where the corresponding ice throw risk zone does not impinge upon an exclusion zone, no longer need to be shutdown which increases the AEP and efficiency of the wind park as those wind turbines can operate at maximum efficiency for the wind conditions. Conventionally, as soon as there is a risk of ice throw those wind turbines would have had to of been shutdown and remain shutdown until the icing event has passed.

The determination of the ice throw risk zone 302 may further take into account a risk value. The risk value may define a level of acceptable risk for the operation of the wind turbine and/or of the wind turbine park when ice is present on the wind turbine blades. The risk value may be a static risk value or may be a variable risk value that is dependent on one or more factors or parameters. Each exclusion zone nearby a wind turbine and/or a wind park may have a risk value associated with it such that each exclusion zone may have its own risk value. Alternatively, a single risk value may be used for all exclusion zones near to a wind turbine and/or wind park.

The risk value may be defined, for example, as a percentage value where the decision or determination of an alteration of the ice throw risk zone and/or wind turbine operating parameters may be further based on the risk value associated with an exclusion zone that has been determined to be impinged by the wind turbines ice throw risk zone.

With reference to FIG. 5, a probability curve is shown for the expected locations of the ice throw around a wind turbine. The x-axis is distance from the wind turbine and the y-axis is the probability of ice being thrown to a given distance from the wind turbine.

A wind turbine is located at 501 and the maximum distance of the ice throw risk zone to either side of the wind turbine is at 502 and 503 where the probability curve meets the x-axis. The dashed lines 504 show that the greatest probability for the ice throw will be at approximately 50% of the maximum distance of the ice throw risk zone.

The ice throw risk zone may be defined such that at the maximum distance from the wind turbine in either direction 502, 503 of the ice throw risk zone is considered to be 100%, as shown in FIG. 5. Therefore, an exclusion zone into which no ice can be thrown will be given a risk value of 100% meaning that it has to lie outside of the maximum area of the ice throw risk zone of the wind turbine and therefore have no probability of ice being thrown into the exclusion zone.

At the maximum area of the ice throw risk zone 502, 503, it is expected that there is only a small probability of ice may be thrown to the full distance of the ice throw risk zone with the majority of the ice throw falling at, for example, 50% of the ice throw risk zone area 504. As such, it may be acceptable and allowable for one or more exclusion zones to accept a greater risk of ice throw in the outer area of the ice throw risk zone as the occurrence of ice throw in the outer area of the ice throw risk zone is reduced and minimal.

Thus, if it is acceptable to an exclusion zone to allow a risk of ice throw into the exclusion zone then the risk value for the exclusion zone can be set accordingly. For example, an exclusion zone may have a risk value of 90% meaning that the ice throw risk zone may be reduced to 90% of the maximum determined area of the ice throw risk zone.

Accordingly, it may be determined that the ice throw risk zone does not impinge the exclusion zone if the exclusion zone lies outside of 90% of the area of the ice throw risk zone.

The risk value associated with one or more exclusion zones may be a variable risk value and vary based on one or more additional factors or parameters. For example, if the exclusion zone is an area of land, such as a sports field, that is used during the daytime but not during the evening or overnight then the risk value may be set at a 100% during the daytime so that there is no possibility of ice being thrown onto the sports field during the daytime. During the evening/overnight the risk value may be set at a higher acceptable risk of ice throw, e.g. 60%, meaning that there is a possibility of ice being thrown onto the sports field and that during the evening/overnight the sports field would not be considered or determined as being impinged if it is outside of 60% of the area of the determined ice throw risk zone for a wind turbine.

As such, once the ice throw risk zone is determined and it is identified that the ice risk throw zone impinges upon an exclusion zone, the risk value associated with the exclusion zone may be taken into account when determining whether the ice throw risk zone should be altered.

In the above examples, the maximum area of the ice throw risk zone was defined as 100% and the risk values defined as a lower percentage. Alternatively, for example, the maximum area of the ice throw risk zone may be defined as 0% and then the risk values associated with each exclusion zone may be 0% to ensure it lies outside the maximum area of the ice throw risk zone, 10% to indicate that a level of risk is acceptable and the exclusion zone has to lie outside of the ice throw risk zone that is reduced by 10%.

As will be appreciated any suitable scale may be used for defining the risk value for one or more exclusion zones.

Examples of the operation of one or more of the embodiments will now be described with reference to FIG. 4.

FIG. 4a shows a schematic of a wind park 401 that comprises a plurality of wind turbines 402. The wind park 401 is located near to a public road 403 and a farm 405. Both the public road 403 and the farm 405 are defined as exclusion zones where ice throw is not permitted.

In FIG. 4b the wind direction 406 is from a direction substantially from the public road 403. The ice throw risk zones 407 are determined for each of the wind turbine 402 in the wind park 401. The ice throw risk zones 407 are determined based on the current operating parameters and environmental conditions of each wind turbine. As can be seen form this example, none of the determined ice throw risk zones 407 impinge upon any of the exclusion zones and as such there is no need to alter the ice throw risk zones 407 of any of the wind turbines 402 thereby allowing all wind turbines to operate normally, which is advantageous over the conventional systems which would have shutdown the entire wind park.

In FIG. 4c, the wind direction 406 is now coming from a direction that is substantially parallel to the public road 403. The ice throw risk zones 407 are determined for each of the wind turbine 402 in the wind park 401. The ice throw risk zones 407 are determined based on the current operating parameters and environmental conditions of each wind turbine. As can be seen form this example, several of the determined ice throw risk zones 407 (as indicated by the dotted outline and solid black filled wind turbine) impinge upon one or more of the predefined exclusion zones 403, 405.

The wind turbines that determine their ice throw risk zone impinges upon an exclusion zone, e.g. the public path and the farm buildings in this example, then those wind turbines may determine whether an alteration to their operating parameters can be determined to reduce the ice throw risk zones such that the ice throw risk zone no longer impinges upon the exclusion zones, and/or take into account any risk value associated with the exclusion zones.

In the above described examples and embodiments, the individual wind turbines determine the ice throw risk zones, determine whether their ice throw risk zones impinge upon any exclusion zones and determine an alteration to the ice throw risk zones so that the ice throw risk zone no longer impinge upon the exclusion zones. However, as will be appreciated, a wind park controller may perform one or more of those functions or features either alone or in combination with the wind turbines based on communications between the wind turbine controller and the wind park controller.

Accordingly, the present invention as described hereinabove in the examples and embodiments advantageously enables the determination of whether an ice throw risk zone of a wind turbine impinges upon an exclusion zone and to determine an alteration to the wind turbine's operating parameters in order to reduce the associated ice throw risk zone. As such, the wind turbines are advantageously able to continue operating during an icing event without having to be shutdown as would be the case in the conventional systems.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method comprising:
    determining an ice throw risk zone for a wind turbine, wherein the ice throw risk zone defines an area surrounding the wind turbine within which ice can be thrown from one or more blades of the wind turbine;
    determining whether the determined ice throw risk zone impinges one or more exclusion zones;
    upon determining that the ice throw risk zone impinges one or more exclusion zones, altering one or more operating parameters of the wind turbine to alter the ice throw risk zone, wherein the altered ice throw risk zone does not impinge the one or more exclusion zones; and
    operating the wind turbine according to the one or more altered operating parameters rather than shutting down the wind turbine.

2. The method of claim 1, in which determining the ice throw risk zone for the wind turbine comprises:
    obtaining one or more parameters, wherein the one or more parameters include operating parameters of the wind turbine, environmental parameters at or near the wind turbine, ice parameters, and structural parameters of the wind turbine; and
    determining the ice throw risk zone based on one or more of the obtained parameters.

3. The method as claimed in claim 2, in which the operating parameters include one or more of a rotor speed value indicative of a rotational speed of a rotor of a wind turbine, blade pitch angle, and blade azimuth; the environmental parameters include a wind speed value indicative of a wind speed at or near the wind turbine; the ice parameters include one or more of ice mass, ice type, and ice location; and the structural parameters include one or more of hub height and blade length.

4. The method according to claim 1, in which determining the ice throw risk zone is based on a ballistic model.

5. The method according to claim 1, in which determining whether the determined ice throw risk zone impinges one or more exclusion zones comprises comparing a location of the ice throw risk zone with a location of one or more exclusion zones.

6. The method according to claim 5, in which comparing the location of the ice throw risk zone with the location of one or more exclusion zones is based on maps, coordinates, or pattern matching.

7. The method according to claim 6, in which a location of one or more exclusion zones is stored in memory or lookup tables.

8. The method according to claim 1, in which determining whether the determined ice throw risk zone impinges one or more exclusion zones comprises obtaining terrain parameters, wherein the determination of the ice throw risk zone is further based on the obtained terrain parameters.

9. The method according to claim 1, further comprising obtaining a risk value associated with the one or more exclusion zones, wherein determining the ice throw risk zone is further based on the associated risk value for the one or more exclusion zones.

10. The method according to claim 9, in which the risk value reduces the ice throw risk zone.

11. The method according to claim 9, in which the risk value is a variable risk value.

12. The method according to claim 1, further comprising shutting down the wind turbine if the determined ice throw risk zone impinges one or more exclusion zones.

13. The method according to claim 1, in which altering the one or more operating parameters comprises determining an alteration to a rotor speed, wherein the alteration to the rotor speed reduces the ice throw risk zone.

14. The method according to claim 1, in which altering the one or more operating parameters comprises determining an alteration to a yaw angle, wherein the alteration to the yaw angle alters an angle of the ice throw risk zone.

15. The method according to claim 1, in which altering the one or more operating parameters comprises:
    determining an alteration to a rotor speed, wherein the alteration to the rotor speed reduces the ice throw risk zone; and
    determining an alteration to a yaw angle, wherein the alteration to the yaw angle alters an angle of the ice throw risk zone.

16. The method according to claim 1, in which altering the one or more operating parameters comprises:
    determining one or more simulated power curves for the altered operating parameters; and
    identifying an optimal alteration to the one or more operating parameters based on the one or more simulated power curves.

17. The method according to claim 12, in which altering the one or more operating parameters is performed iteratively until an alteration to the one or more operating parameters is identified that ensures the ice throw risk zone does not impinge any exclusion zone.

18. The method according to claim 1, in which altering the one or more operating parameters comprises determining a pitch strategy for one or more blades to induce stall, or vibrations, or deformation in the one or more blades such that ice is thrown from the one or more blades at or near a lowest point of rotation of the one or more blades to reduce the ice throw risk zone.

19. A wind turbine comprising:
a tower;
a nacelle located on top of the tower;
a rotor operatively attached to the nacelle;
one or more rotor blades operatively attached to the rotor; and
an ice throw risk safety system adapted to perform an operation, comprising:
  determining an ice throw risk zone for the wind turbine, wherein the ice throw risk zone defines an area surrounding the wind turbine within which ice can be thrown from the one or more rotor blades of the wind turbine;
  determining whether the determined ice throw risk zone impinges one or more exclusion zones;
  upon determining that the ice throw risk zone impinges one or more exclusion zones, altering one or more operating parameters of the wind turbine to alter the ice throw risk zone, wherein the altered ice throw risk zone does not impinge the one or more exclusion zones; and
  operating the wind turbine according to the one or more altered operating parameters rather than shutting down the wind turbine.

20. A non-transitory computer readable medium containing code which, when executed by one or more processors, performs an operation comprising:
  determining an ice throw risk zone for a wind turbine, wherein the ice throw risk zone defines an area surrounding the wind turbine within which ice can be thrown from one or more blades of the wind turbine;
  determining whether the determined ice throw risk zone impinges one or more exclusion zones; and
  upon determining that the ice throw risk zone impinges one or more exclusion zones, altering one or more operating parameters of the wind turbine to alter the ice throw risk zone, wherein the altered ice throw risk zone does not impinge the one or more exclusion zones; and
  operating the wind turbine according to the one or more altered operating parameters rather than shutting down the wind turbine.

* * * * *